United States Patent [19]

Endo et al.

[11] Patent Number: 5,448,128

[45] Date of Patent: Sep. 5, 1995

[54] VIBRATION TYPE DRIVING DEVICE

[75] Inventors: Hiroki Endo, Obu; Keisuke Honda, Toyohashi, both of Japan

[73] Assignee: Honda Denshi Kabushiki Kaisha, Aichi, Japan

[21] Appl. No.: 222,793

[22] Filed: Apr. 4, 1994

Related U.S. Application Data

[63] Continuation-in-part of Ser. No. 990,095, Dec. 14, 1992, abandoned.

[30] Foreign Application Priority Data

Dec. 12, 1991 [JP] Japan ................. 3-110059

[51] Int. Cl.⁶ .............................................. H02N 2/00
[52] U.S. Cl. ....................................... 310/323; 310/316
[58] Field of Search ............... 310/323, 325, 316, 328, 310/317

[56] References Cited

U.S. PATENT DOCUMENTS

| | | | |
|---|---|---|---|
| 3,368,085 | 2/1968 | McMaster | 310/325 |
| 3,524,085 | 8/1970 | Shoh | 310/325 |
| 4,065,687 | 12/1977 | Mishiro | 310/325 |
| 4,173,725 | 6/1979 | Asai et al. | 310/325 |
| 4,652,786 | 3/1987 | Mishiro | 310/333 |
| 4,691,724 | 9/1987 | Garcia et al. | 310/323 |
| 4,697,117 | 9/1987 | Mishiro | 310/323 |
| 4,703,214 | 10/1987 | Mishiro | 310/328 |
| 4,705,980 | 11/1987 | Mishiro | 310/323 |
| 4,812,697 | 3/1989 | Mishiro | 310/323 |
| 4,914,337 | 4/1990 | Takagi | 310/316 |
| 5,057,182 | 10/1991 | Wuchinich | 310/323 |
| 5,112,300 | 5/1992 | Ureche | 310/323 |
| 5,122,700 | 6/1992 | Tamai et al. | 310/323 |
| 5,336,958 | 8/1994 | Saya et al. | 310/316 |
| 5,343,108 | 8/1994 | Miyazawa et al. | 310/323 |

FOREIGN PATENT DOCUMENTS

| | | | |
|---|---|---|---|
| 0141980 | 6/1987 | Japan | 310/323 |
| 0124784 | 5/1988 | Japan | 310/323 |
| 6474072 | 3/1989 | Japan | H02N 2/00 |

*Primary Examiner*—Thomas M. Dougherty
*Attorney, Agent, or Firm*—Dennison, Meserole, Pollack & Scheiner

[57] ABSTRACT

A vibration type driving device in which a piezoelectric element is interposed between a pair of blocks connected to each other by a rod, a part of the surface of the piezoelectric element being covered with an electrode. Application of high frequency voltage to the electrode causes resonance of vertical vibrations and bending vibrations, which is effective to generate elliptical movement of the end surface of the block. The electrode is divided into three or more sections, preferably into four sections. A change-over switch is provided for selecting the electrode sections to be energized in accordance with the direction of the driving force. This permits linear movement of an article in a desired direction.

10 Claims, 19 Drawing Sheets

| ENERGIZED SECTION | | | | DRIVING DIRECTION |
|---|---|---|---|---|
| CHANGE-OVER SWITCH | PHASE A | CHANGE-OVER SWITCH | PHASE B | |
| III, IV | | I', II' | | ← |
| I, II | | III', IV' | | → |
| I, IV | | II', III' | | ↓ |
| II, III | | I', IV' | | ↑ |

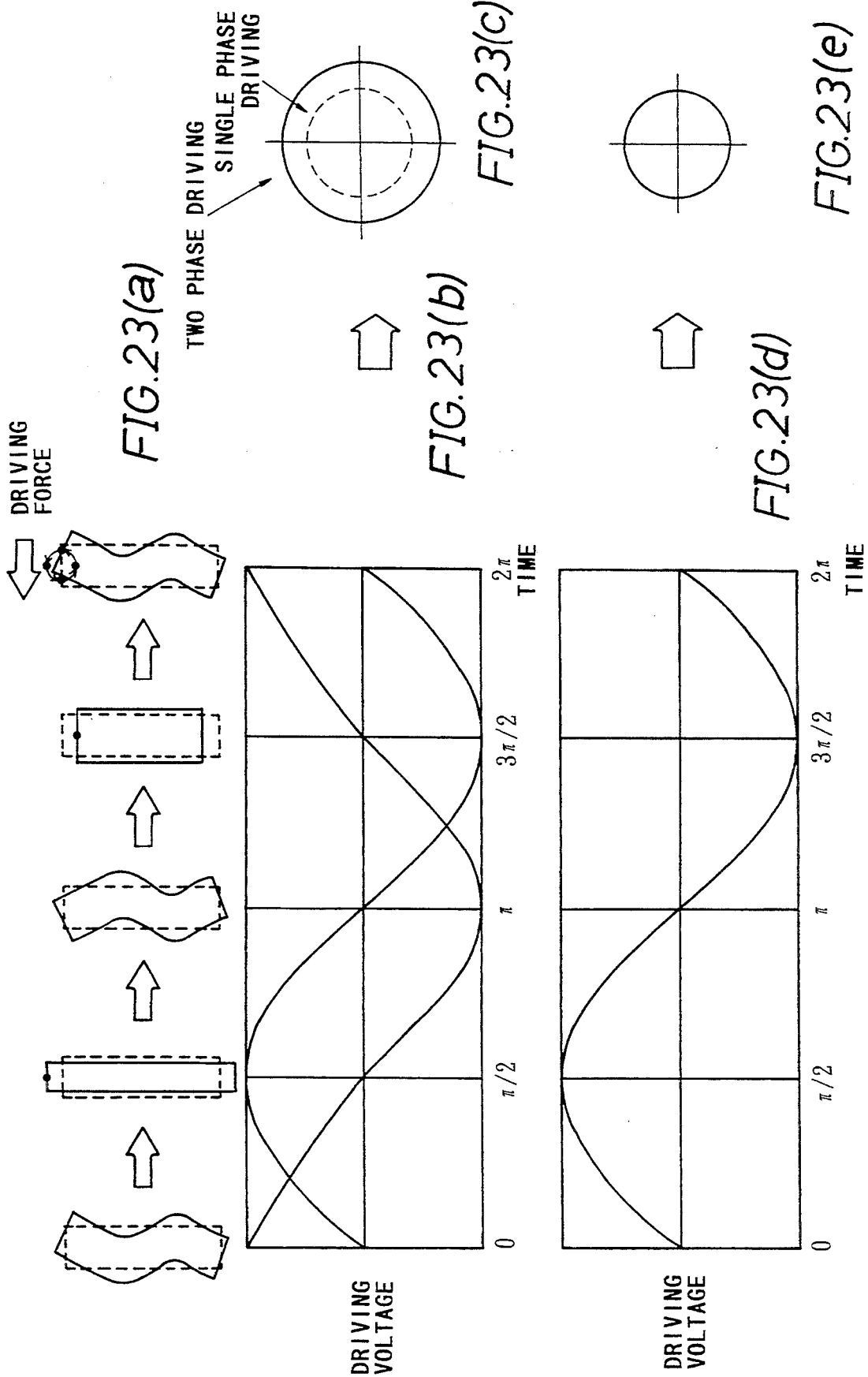

VIBRATION TYPE DRIVING DEVICE

This application is a continuation-in-part application of U.S. application Ser. No. 07/990,095, filed Dec. 14, 1992, abandoned.

BACKGROUND OF THE INVENTION

1. Field of the Invention

The present invention relates to a vibration type driving device in which high frequency voltage is applied to a piezoelectric element to generate high frequency vibrations, which are used to move an article.

2. Description of the Prior Art

One known art is so called a Langevin type oscillator including several annular piezoelectric elements interposed between a pair of blocks. An example of such an oscillator is disclosed in U.S. Pat. No. 5,122,700. FIG. 15 shows the Langevin type oscillator which includes a pair of blocks 151 and 152, annular piezoelectric elements 153, 154, 155, 156, electrodes 157, 158, 159, and a bolt 160 connecting the blocks 151 and 152 with the piezoelectric elements and the electrodes interposed therebetween. The piezoelectric elements have a positive polarity on their half side and a negative polarity on the other half side. When high voltage is applied to the left side surface of the oscillator in the drawing, each positive part "a" expands and each negative part "b" contracts. On the other hand, when high voltage is applied to the right side surface of the oscillator, each positive part "a" contracts and each negative part "b" expands. The electrode 158 and the pair of the metal blocks 151, 152 are grounded, and the electrodes 157, 159 are applied with sine wave voltage shown in FIG. 16. The electrical phases of voltage applied to the electrode 157, 159 are displaced with each other as shown in FIG. 16.

According to the Langevin type oscillator, a progressive wave is generated at the front end of the block 151 as shown by an arrow 162, thus rotating a cylindrical spool 161 in the direction of the arrow 162. By using this phenomenon, a film can be wound on the spool 161.

In addition to U.S. Pat. No. 5,122,,700, U.S. Pat. Nos. 4,697,117, 4,812,697 and 4,652,786 also disclose such an oscillator which rotates a rotor or a spool by a progressive wave generated on a block.

Many researches have been made on the progressive-wave based oscillator since it is very useful for rotating a rotor or a spool in place of a conventional motor widely used. However, an oscillator including piezoelectric elements is not restricted to the progressive-wave based oscillator. Further, functions other than "rotation" of a rotor, a spool, etc. may be required for the oscillator. The inventors of the present application have noted the above points and attained an idea to use bending vibrations.

Vertical and torsional vibrations have been used in the progressive-wave based Langevin type oscillator. In contrast, the inventors use vertical and bending vibrations. The most basic structure of this type of oscillator is disclosed in Japanese Laid-Open Patent Publication No. 64-74072. The basic structure is shown in FIGS. 13(a) to 13(c). FIG. 13(a) is an exploded perspective view of the vibration type driving device in the prior art, and FIG. 13(b) is a sectional view in a central plane of the device in the assembled condition. The driving device includes a metal rod 102 which is provided at both ends thereof with threaded portions 102a, 102b. The threaded portions 102a, 102b are adapted to secure a pair of metal blocks 92, 104 to the respective ends of the rod 102. The metal blocks 92, 104 have respective threaded holes 92a, 104a into which the threaded portions 102a, 102b are engaged to fasten the pair of metal blocks 92, 104 to the respective ends of the metal rod 102.

The device further includes an annular conductor plate 94, an annular piezoelectric element 96, a pair of semicircular conductor plates 98a, 98b and another annular piezoelectric element 100. The conductor plate 94, the piezoelectric element 96, the pair of conductor plates 98a, 98b and the piezoelectric element 100 are interposed between the pair of metal blocks 92 and 104.

As shown in FIG. 13(b), the conductor plate 94 is in contact with the threaded portion 102a of the rod 102, so that the metal block 92, the metal rod 102 and the metal block 104 are all electrically connected to the conductor plate 94. When in use, the conductor plate 94 is grounded so as to ground the metal block 92, the metal rod 102 and the metal block 104. The semicircular conductor plates 98a, 98b are insulated from the rod 102. The conductor plates 98a, 98b are also insulated from each other. The semicircular conductor plates 98a, 98b are adapted to cover corresponding parts of the piezoelectric elements 96, 100. When in use, high frequency voltage of several tens KHz is applied to either one of the semicircular conductor plates 98a, 98b.

FIGS. 14(a) to 14(c) show the phenomenon generated by application of high frequency voltage to one of the semicircular conductor plates, in the illustrated example, 98a in a rather exaggerated manner. When high frequency voltage is applied to the semicircular conductor plate 98a, the thickness of parts of the piezoelectric elements 96, 100 covered with the conductor plate 98a is increased and decreased, causing vertical vibrations of the assembly DV of the rod 102 and the pair of blocks 92, 104, as shown in FIGS. 14(a) and 14(c). As no voltage is applied to the other semicircular conductor plate 98b, there is no variation in thickness of parts of the piezoelectric elements 96, 100 covered with the conductor plate 98b. Consequently, the assembly DV carries out bending vibrations, as shown in FIGS. 14(b) and 14(d). Here, the length of the assembly and the frequency of the applied voltage can be so set that the end surface 91 of the assembly DV may define the resonance point of the vertical vibrations and simultaneously the resonance point of the bending vibrations. Thus, the end surface 91 of the assembly DV can move in an elliptical path, as shown by arrows RL, RR in FIG. 14(d).

When an article to be driven by this device is placed on the end surface 91 of the assembly DV, the movement of the end surface in the direction of the arrow RL causes the article to be moved in the direction of an arrow X1. During movement of the end surface 91 of the assembly DV in the direction of the arrow RR, contact pressure between the end surface 91 of the assembly DV and the article is reduced, due to inertia of the article to be driven as well as high frequency of the elliptical vibrations defined by the arrows RL, RR. This results in reduced force generated for moving the article to the left in the drawing, though the end surface 91 is moved in the direction of the arrow RR. Thus, the article can be driven in the direction of the arrow X1 in the drawing.

When high frequency voltage is applied to the other semicircular conductor plate 98b, the article to be driven is moved in the opposite direction (the direction of an arrow X2 in FIG. 13). In case driving operation is necessary only in one direction, either one of the semi-circular conductor plates 98a, 98b may be formed of an insulating material.

The Langevin type oscillator described above avoids using a progressive wave, permitting an article to be moved linearly. Further, displacement or adjustment of the electrical phase of applied voltage is not required, thus drastically simplifying the driving circuit.

SUMMARY OF THE INVENTION

The advantage of moving an article linearly instead of rotating it may be used, for example, as follows. FIG. 24 shows a rearview mirror for a vehicle. At the back of the mirror RM, a partial sphere 241 is secured with its center on an origin O. One end of a Langevin type oscillator 242 is secured on the origin O, while the other end thereof is in contact with the partial sphere 241. If the oscillator shown in FIG. 13 is determined to be driven in the Y-axis direction, the mirror RM is rotated by the oscillator around Z-axis with its rotational center on the origin O, thus enabling the mirror RM to be angularly adjusted in the horizontal direction. This construction makes it possible to completely eliminate the complicated conventional mechanism in which the rotation of a motor is transmitted via gear trains to an angular adjustment mechanism of the mirror.

However, the mirror RM requires to be angularly adjusted also in the vertical direction. Further, it is sometimes necessary to vibrate the whole mirror MR to blow off water drops adhered thereto. The oscillator shown in FIG. 13 can not meet the above requirements.

A first object of the present invention is to provide a vibration type driving device in which the moving direction of an article is adjustable when moving it linearly. Referring to the example shown in FIG. 24, the article is permitted to move not only in the Y-axis direction so as to be rotated around the Z-axis but also in the Z-axis direction so as to be rotated around the Y-axis.

A second object of the present invention is to provide a vibration type driving device in which the moving force and the moving speed of the article are improved.

A further object of the present invention is to provide a vibration type driving device in which the article can be vibrated. Referring to the example shown in FIG. 24, the mirror RM is permitted to be microscopically vibrated in the X-axis direction.

To achieve the above object, according to the present invention, an electrode contacting at least one surface of a piezoelectric element of a Langevin type oscillator is divided into three or more sections, preferably into four sections. Then, a change-over switch is provided to select which electrode section to be energized or not to be energized, in accordance with the driving direction of an article. With this structure, a driving force is generated within a surface including an axis center and a center of an energized electrode. Thus, a different driving direction can be obtained by changing an electrode section to be energized.

Further, in another way to drive the article in the desired direction, an electrode section located in the anti-driving direction may be energized, and at the same time a switch for applying voltage whose phase leads by $\pi/2$ may be provided to an electrode section on the driving direction side. With this structure, the amplitude of vibrations becomes large, thus realizing more increased driving force and driving speed.

The present invention will be more fully understood from the following detailed description and appended claims when taken with the drawings.

BRIEF DESCRIPTION OF THE DRAWINGS

FIG. 23(a) to 23(e) show five operational conditions in single phase driving and two phase driving.

DETAILED DESCRIPTION OF THE PREFERRED EMBODIMENTS (First Embodiment)

Figure 1A:
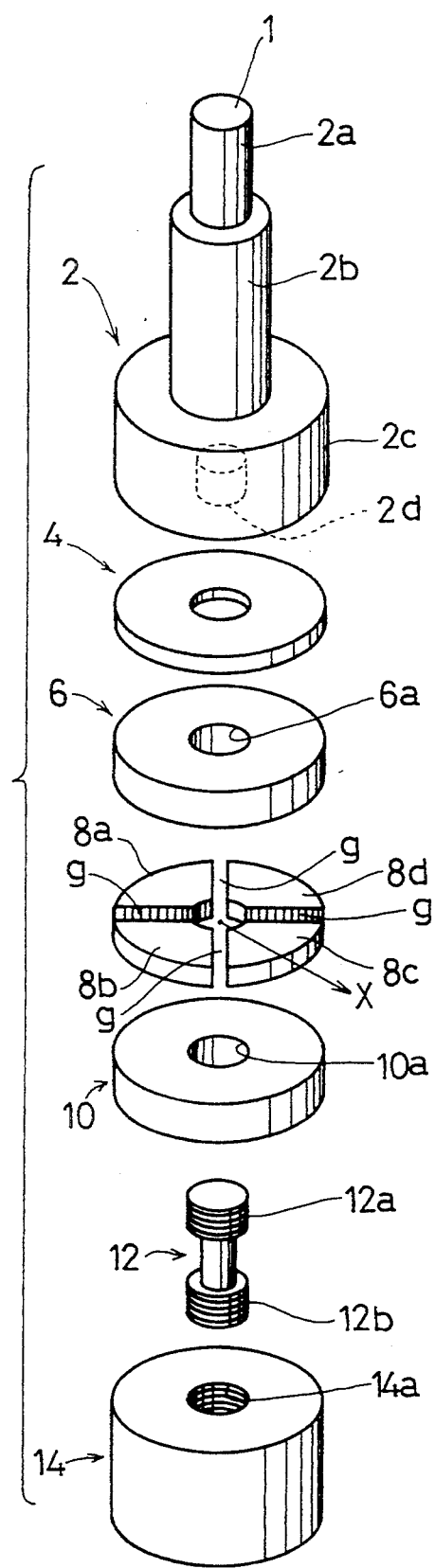
FIGS. 1(a) to 1(c) show a first embodiment of the vibration type driving device according to the present invention.

Now, a first embodiment of the vibration type driving device according to the present invention will be described with reference to FIGS. 1(a) to 1(c). The device includes a metal rod 12 formed at both ends thereof with threaded portions 12a, 12b. The device further includes a pair of metal blocks 2, 14 with respective threaded holes 2d, 14a extending along the axis thereof. The threaded portion 12a, 12b are adapted to be engaged into the threaded holes 2d, 14a to secure the blocks 2, 14 to both ends of the rod 12.

The device further includes an annular conductor plate 4, an annular piezoelectric element formed with a central opening 6a, a divided electrode divided into quarter sections 8a, 8b, 8c, 8d, and another annular piezoelectric element formed with a central opening 10a. As shown in FIG. 1(b), the conductor plate 4, the piezoelectric element 6, the divided electrode 8a, 8b, 8c, 8d and the other annular piezoelectric element 10 are interposed between the blocks 2, 14, with the rod 12 extending through the central openings 6a, 10a of the annular piezoelectric elements 6, 10.

The conductor plate 4 is in contact with the metal block 2, so that, when the conductor plate 4 is grounded, the metal block 2, the metal rod 12 and the metal block 14 are grounded. The quarter electrode sections 8a, 8b, 8c, 8d are insulated from one another via gaps g, and they are also insulated from the rod 12. Each of the electrode sections 8a, 8b, 8c, 8d covers corresponding quarter parts of the surfaces of the piezoelectric elements 6, 10. In other words, the piezoelectric element 6 is interposed between the conductor plate 4 (constituting an electrode) and the electrode sections 8a to 8d. The piezoelectric element 10 is interposed between the block 14 (constituting an electrode) and the electrode sections 8a to 8d.

Figure 1B:
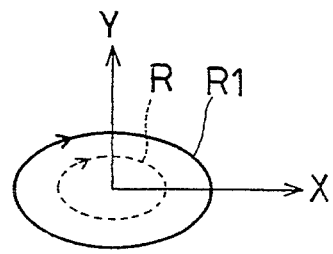
Figure 1C:
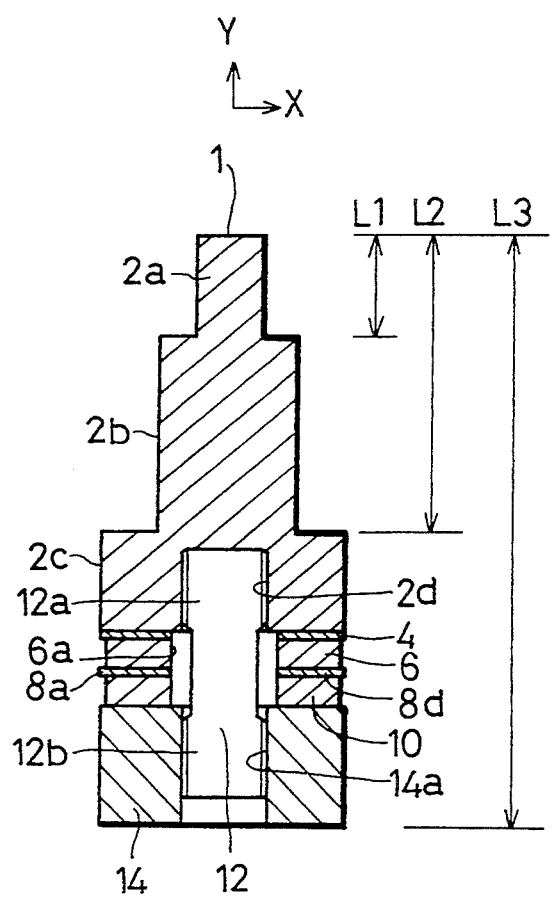

In FIG. 1(b), the full length L3 of the assembled device is about 90 mm, which is set to be equal to half the wave length of vertical vibrations caused by vibrations of the device at the frequency of 28 KHz and also to three-halves the wave length of bending vibrations. Thus, selection of the full length of 90 mm and the frequency of 28 KHz causes the end surface 1 of the block 2 to define the resonance point of the vertical vibrations and the bending vibrations.

Figure 9:
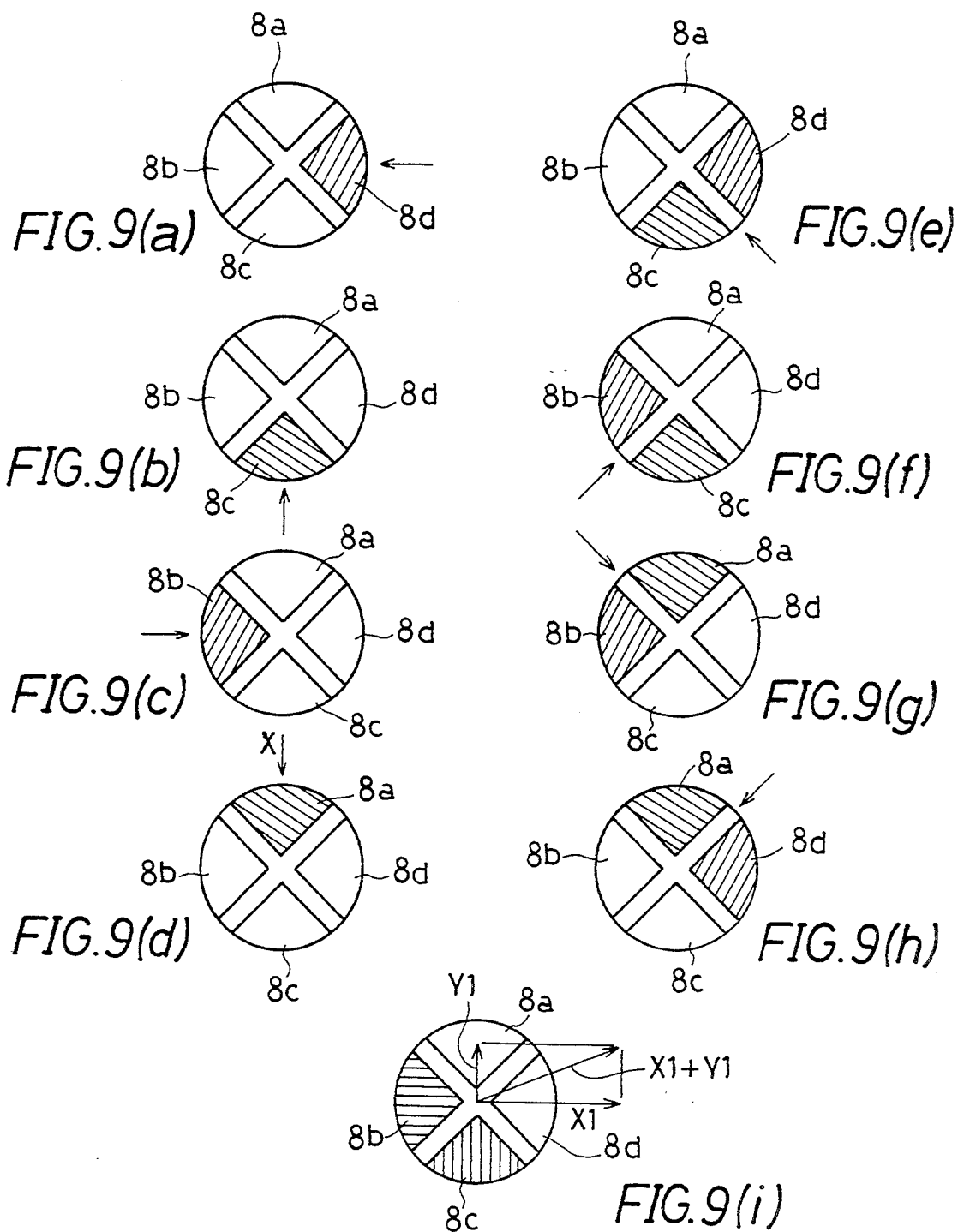
FIGS. 9(a) to 9(i) are plan views of a divided electrode, showing the relationship between a section or sections of the divided electrode selected to be applied with high frequency voltage and driving directions.

When high frequency voltage of 28 KHz is applied only to the section 8a of the divided electrode 8a to 8d, the device carries out bending vibrations and vertical vibrations in a plane X in FIG. 9(d). Thus, the driving surface 1 of the device carries out elliptical movement in a plane X-Y, as shown in FIG. 1(c), wherein Y designates the axial direction of the device. As a result, the article in contact with the driving surface 1 can be driven linearly in the X direction.

In this embodiment, the block 2 is provided with a portion measuring a length L2 from the driving surface 1 and formed in a reduced-diameter double step including an upper step portion 2a and a lower step portion 2b so as to define a stepped horn. In this embodiment, the length L2 is set to be a quarter of the wave length of vertical vibrations so as to amplify vertical movement generated in the driving surface 1. Further, in this embodiment, the upper step portion 2a measures a length L1 from the driving surface and has a smaller diameter than the lower step portion 2b so as to define a partial horn. The length L1 is set to be a quarter of the wave length of bending vibrations so as to also amplify bending vibrations generated in the driving surface 1.

In this embodiment, the elliptical movement R generated in the driving surface 1 without any horns is thus amplified both in the X and Y directions (as indicated by R1). Consequently, both driving speed and driving force are increased.

In this embodiment, the electrode is divided into quarter electrode sections 8a, 8b, 8c, 8d and selection of quarter electrode sections to be applied with high frequency voltage determines the driving direction, as shown in FIGS. 9(a) to 9(d). Furthermore, high frequency voltage may be applied to two adjacent quarter electrode sections to obtain additional driving directions. Thus, as the amplitude of vibrations is increased, both the driving force and the driving speed are improved.

It is generally possible to selectively apply different voltages V1, V2 to the two adjacent electrode sections, respectively, so as to obtain resultant driving operation in a desired driving direction at a desired driving speed, as shown in FIG. 9(i).

Figure 10:
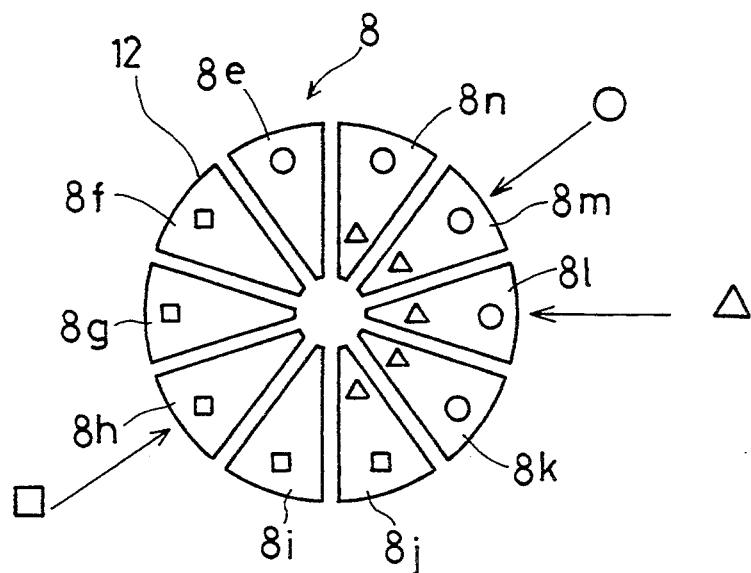
FIG. 10 is a plan view of another divided electrode, showing the relationship between sections of the divided electrode selected to be applied with high frequency voltage and driving directions.
Figure 11:
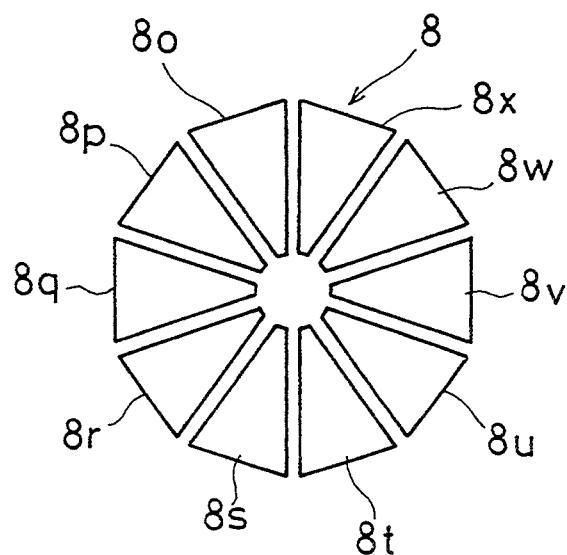
FIG. 11 is a plan view of a modified divided electrode.
Figure 12:
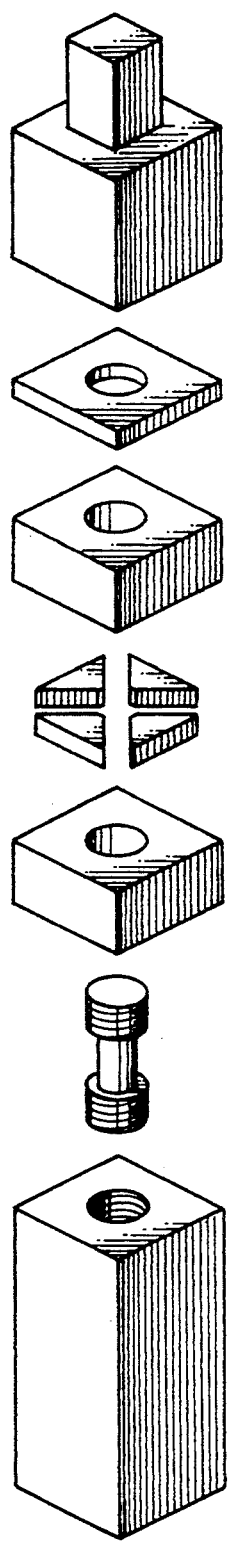
FIG. 12 shows a ninth embodiment of the present invention.
Figures 13A, 13B, 13C:
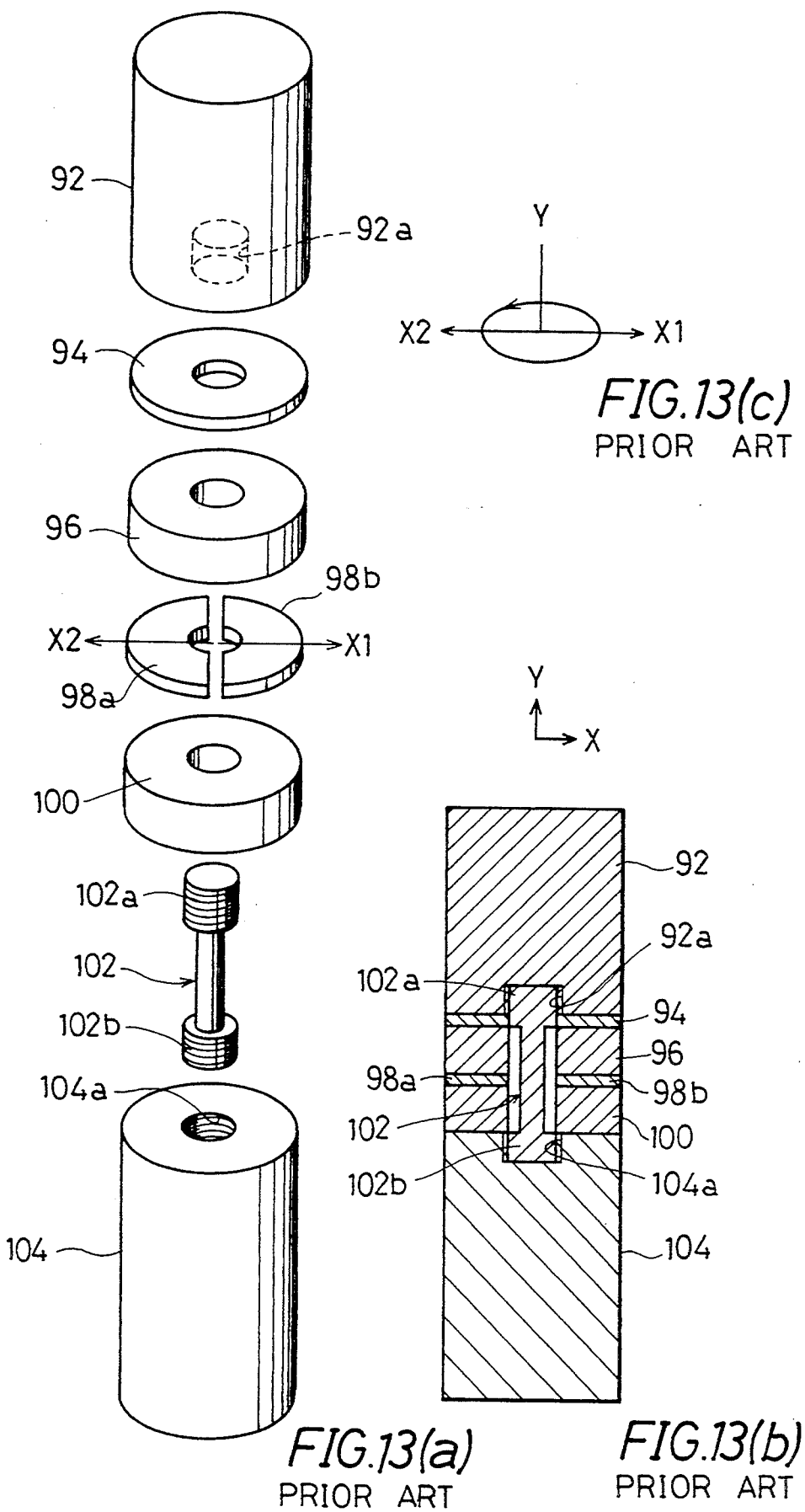
FIGS. 13(a) to 13(c) show a prior art vibration type driving device.
Figures 14A, 14B, 14C, 14D:
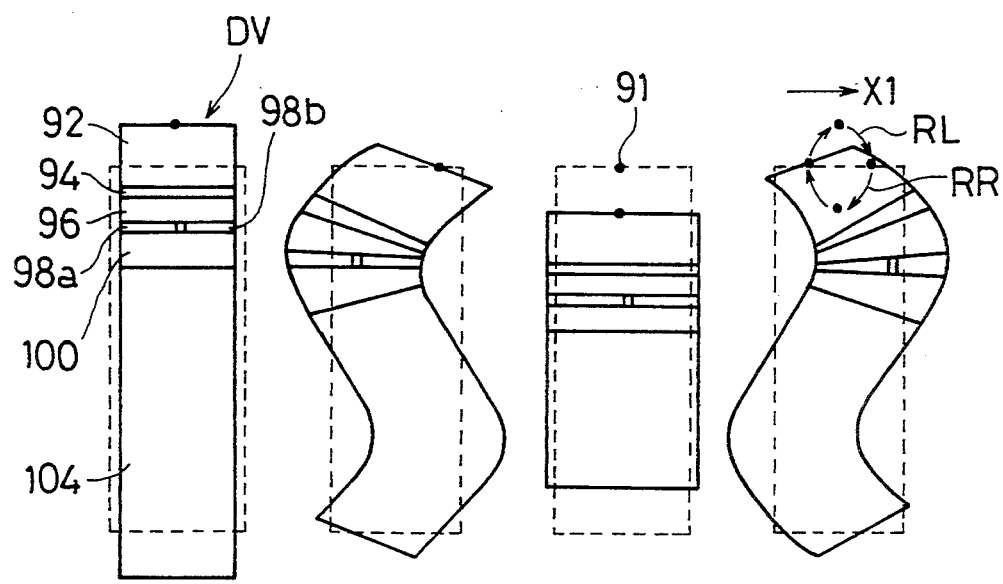
FIGS. 14(a) to 14(d) show four operational conditions of the prior art device of FIG. 13 in an exaggerated manner.
Figure 15:
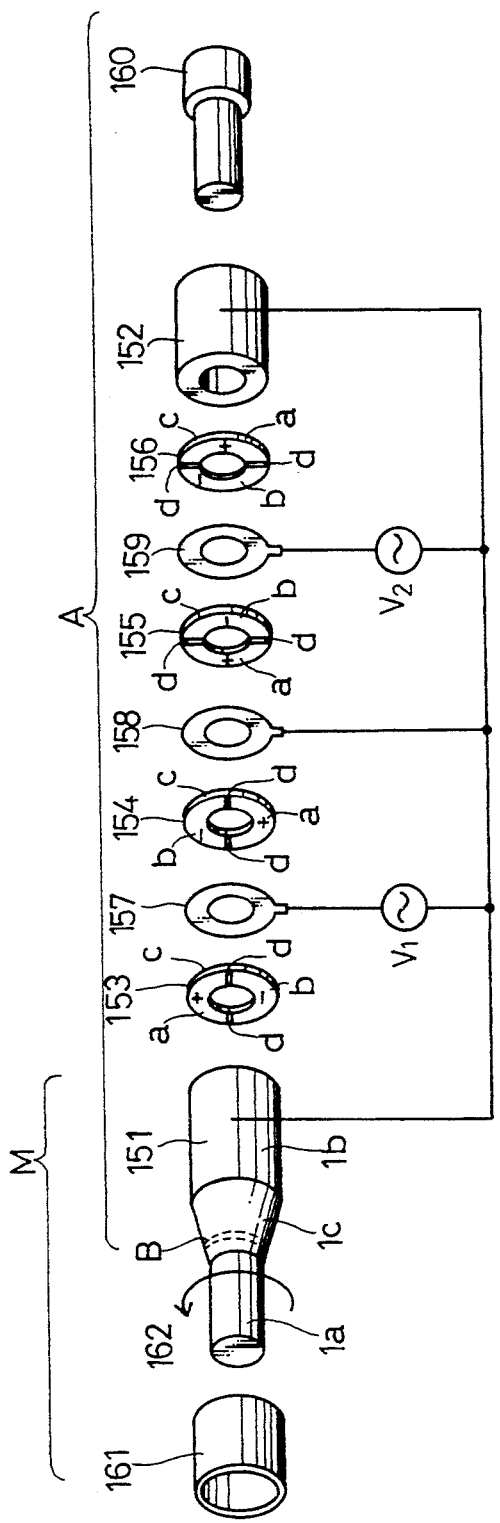
FIG. 15 shows another prior art vibration type driving device.
Figure 16:
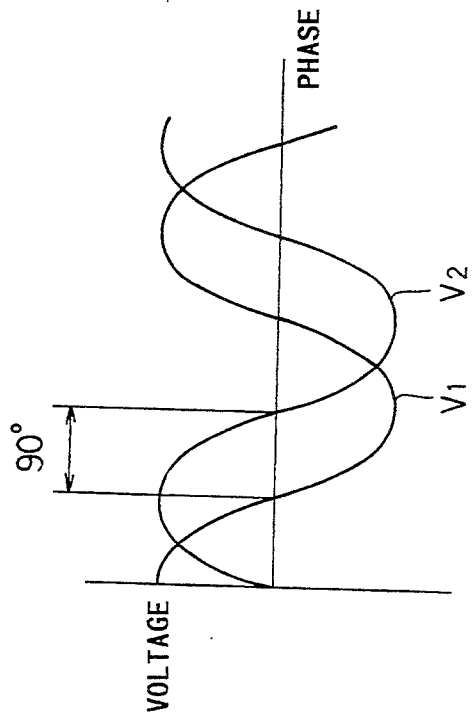
FIG. 16 shows voltage to be applied to the prior art device of FIG. 15.

Division of the electrode into three or more sections ensures driving operation in any desired direction. For example, division of electrode into ten sections, as shown in FIG. 10, will ensure more precise change-over of the driving direction. It will be noted that application of high frequency voltage to a combination of five adjacent electrode sections marked with symbols ○, △ and □ will permit driving operation in the direction ○, △ and □, respectively. The piezoelectric elements and the electrode may be other than circular in section and, for example, polygonal, as shown in FIG. 11. Alternatively, they may be rectangular, as shown in FIG. 12.

Figures 19A, 19B:
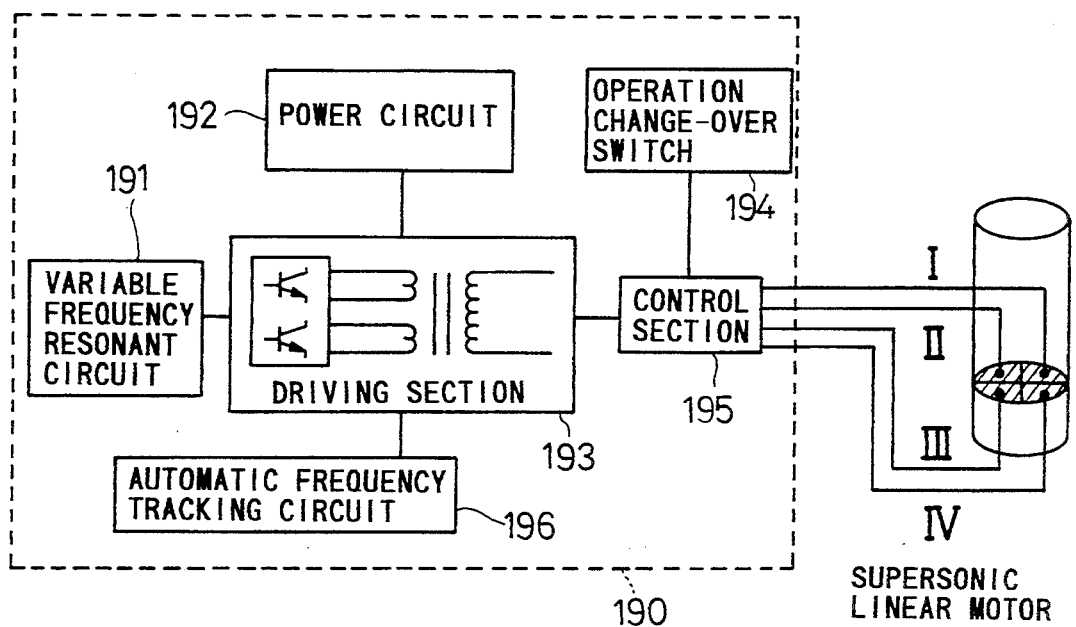
FIGS. 19(a) and 19(b) show a driving circuit, energized electrode sections and the corresponding driving directions.

Now, an example embodying the states shown in FIGS. 9(e) to 9(h) will be described with reference to FIGS. 19(a) and 19(b). In FIG. 19(a), a driving circuit 190 includes a variable frequency oscillation circuit 191, a power circuit 192, a driving section 193, an operation change-over switch 194, a control section 195, and an automatic frequency tracking circuit 196. The variable frequency oscillation circuit 191, outputs a driving waveform at a desired frequency within a predetermined frequency range centering around a resonant frequency (28 KHz in this case) of the driving device. Based on the operation of the power circuit 192 and the variable frequency oscillation circuit 191, the driving section 193 outputs sine wave voltage at the resonant frequency. As shown in FIG. 19(b), the operation change-over switch 194 and the control section 195 cooperates to select either one of the following four positions: a first position where lead wires (III, IV) are energized, a second position where lead wires (I, II) are energized, a third position where lead wires (I, IV) are energized, and a fourth position where lead wires (II, III) are energized. The switch 194 is changed over corresponding to the driving directions of an article. That is, two electrode sections on the opposite side of the direction in which the article is to be fed are selectively energized. Furthermore, the switch 194 is also allowed to select a position where all the lead wires (I, II, III, IV) are simultaneously energized, as shown at the bottom column in FIG. 19(B). In this position, the driving device vibrates in the longitudinal direction at the frequency of 28 KHz.

Turning to FIG. 19(a), the automatic frequency tracking circuit 196 imitates, in the driving device, resonant frequency variations caused by temperature variations or the like, so that it increases or decreases the oscillation frequency of the variable frequency oscillation circuit centering around 28 KHZ.

Figure 20:
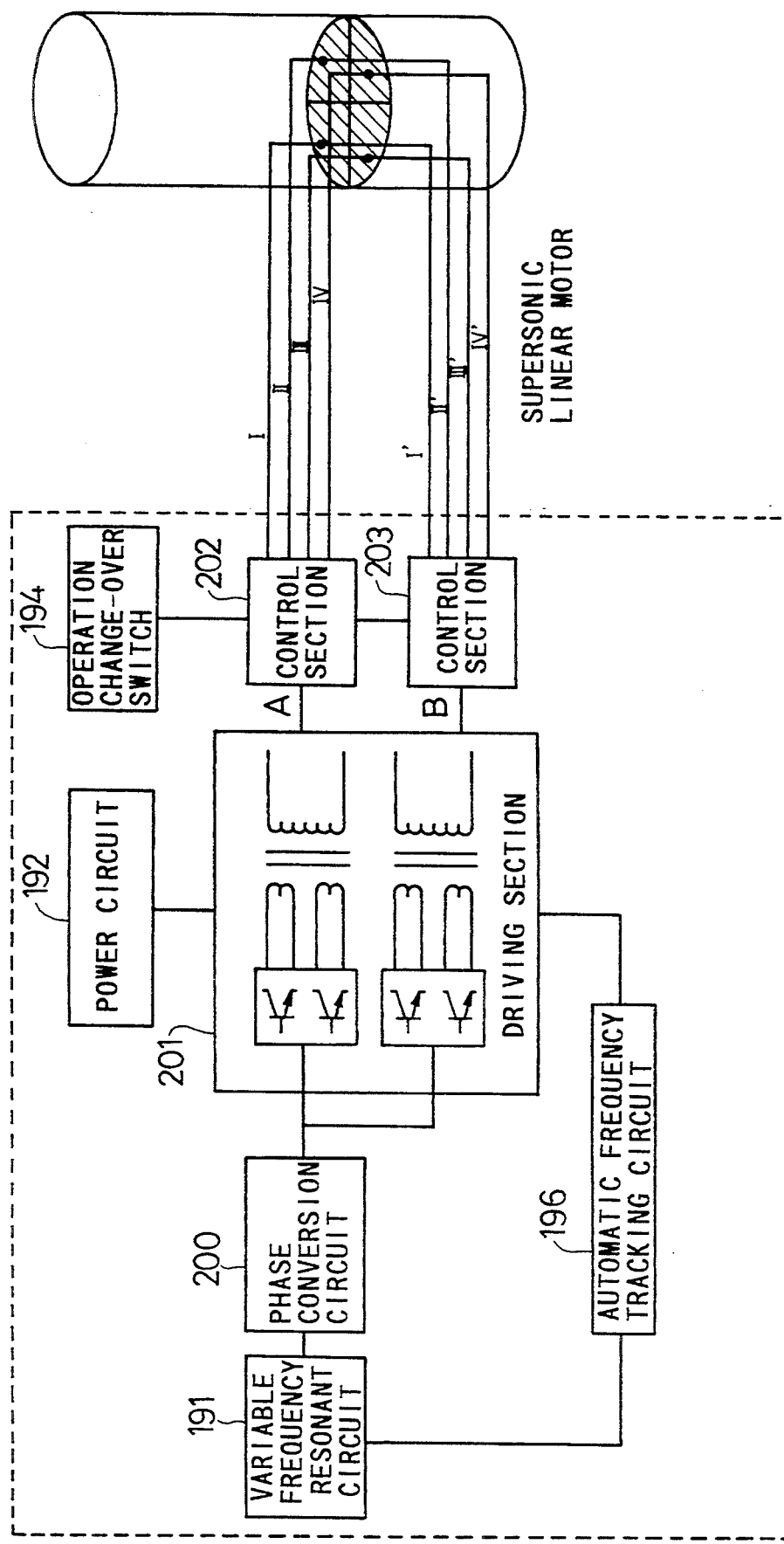
FIG. 20 shows another driving circuit.
Figures 21, 22:
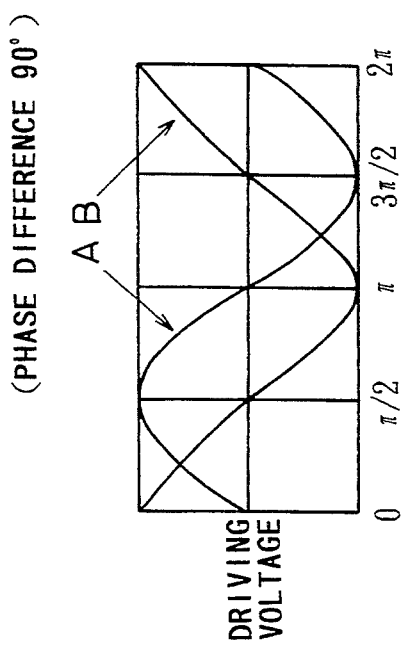
FIG. 21 shows voltage to be applied to the circuit of FIG. 20.
FIG. 22 shows energized electrode sections and the corresponding driving directions.
Figure 24:
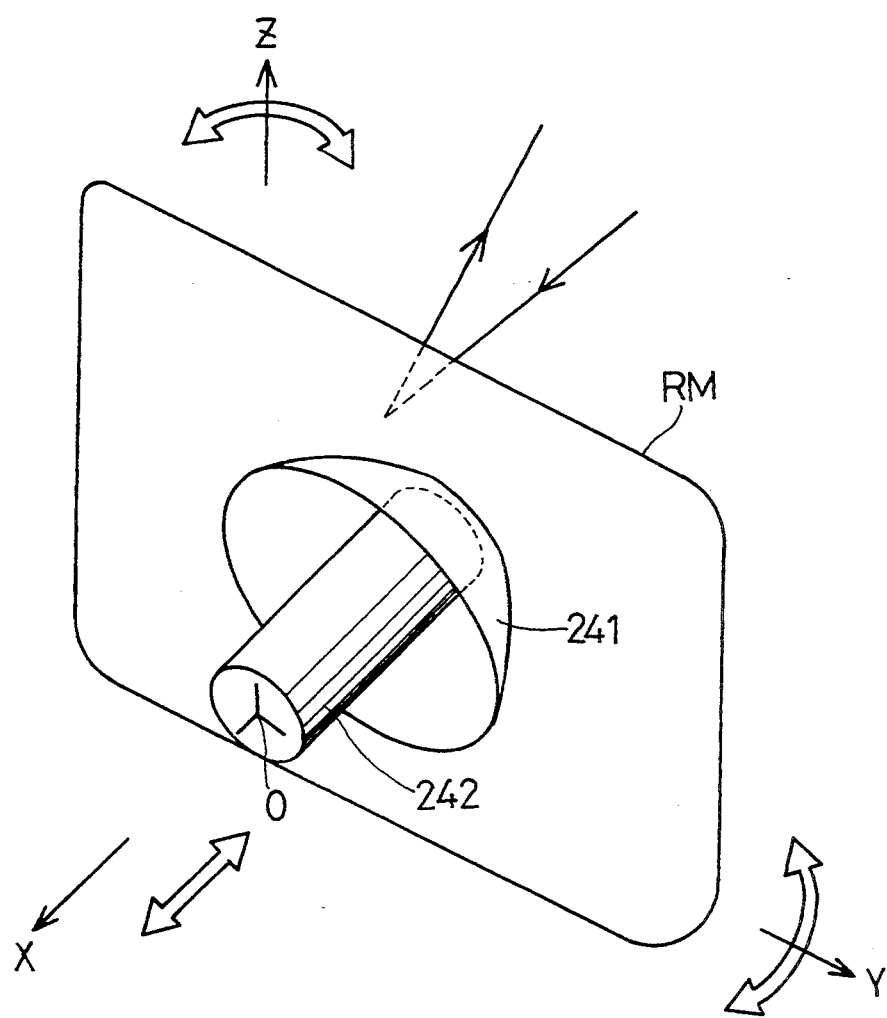
FIG. 24 shows an application example of the present invention.

Another driving system shown in FIGS. 20 to 22 may be used in place of the driving system shown in FIGS. 19(a) and 19(b).

The difference in the driving circuit of FIG. 20 from that of FIG. 19(a) is that a phase conversion circuit 200 is added, that a driving section 201 is modified to output two sine waves, and that two control sections 202 and 203 are prepared. The control section 202 is adapted to change over lead wires to be applied with a sine wave shown by "A" in FIG. 21, which is exactly the same as the control section in FIG. 19(a). On the other hand, the control section 203 is adapted to change over lead wires to be applied with a sine wave shown by "B" (whose phase leads that of the sine wave of "A" by $\pi/2$) in FIG. 21. The lead wires are changed in a manner shown in FIG. 22. When the control section 202 energizes electrode sections (III, IV) with phase "A", the control section 203 is adapted to energize electrode sections (I', II') with phase "B". In this operation, as shown in FIG. 22, phase "A" is applied to the two electrode sections on the opposite side of the direction in which an article is to be fed, while phase "B" (which leads phase "A" by $\pi/2$) is applied to the two electrode sections on the side of the driving direction.

Operational conditions driven by a single-phase circuit (the operation in FIG. 19(a) and 19(b)) and by a two-phase circuit (the operation in FIGS. 20 and 21) are shown in FIGS. 23(a) to 23(e). The two-phase driving brings about the larger vibrations, causing an elliptical vibrations of the driving surface 1 (FIGS. 1(a) to 1(c)) to be larger in both of the vertical and horizontal directions. This results in increase of the driving force and the driving speed.

Figure 17:
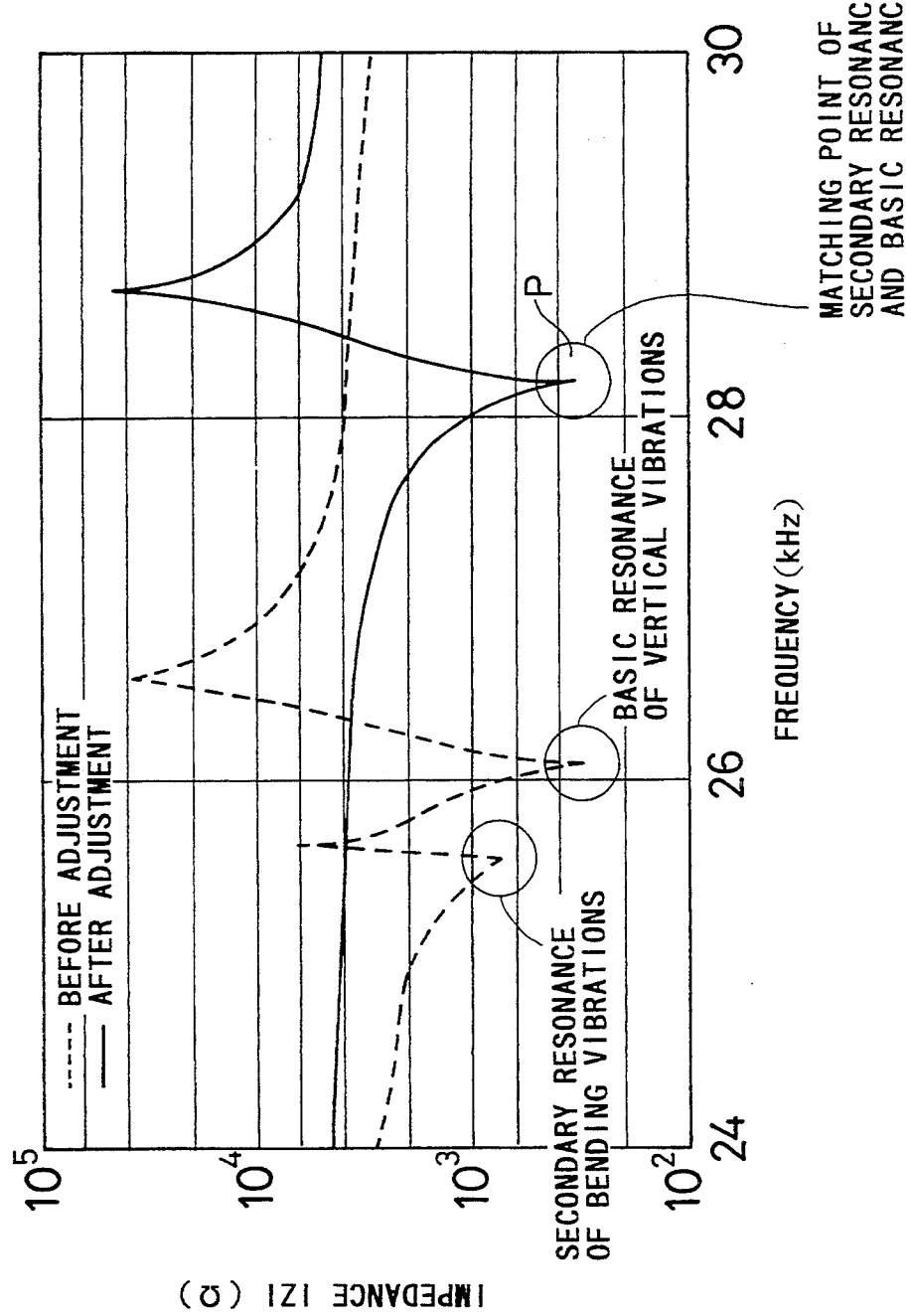
FIG. 17 is a chart showing the frequency-impedance characteristics of the first embodiment.
Figure 18:
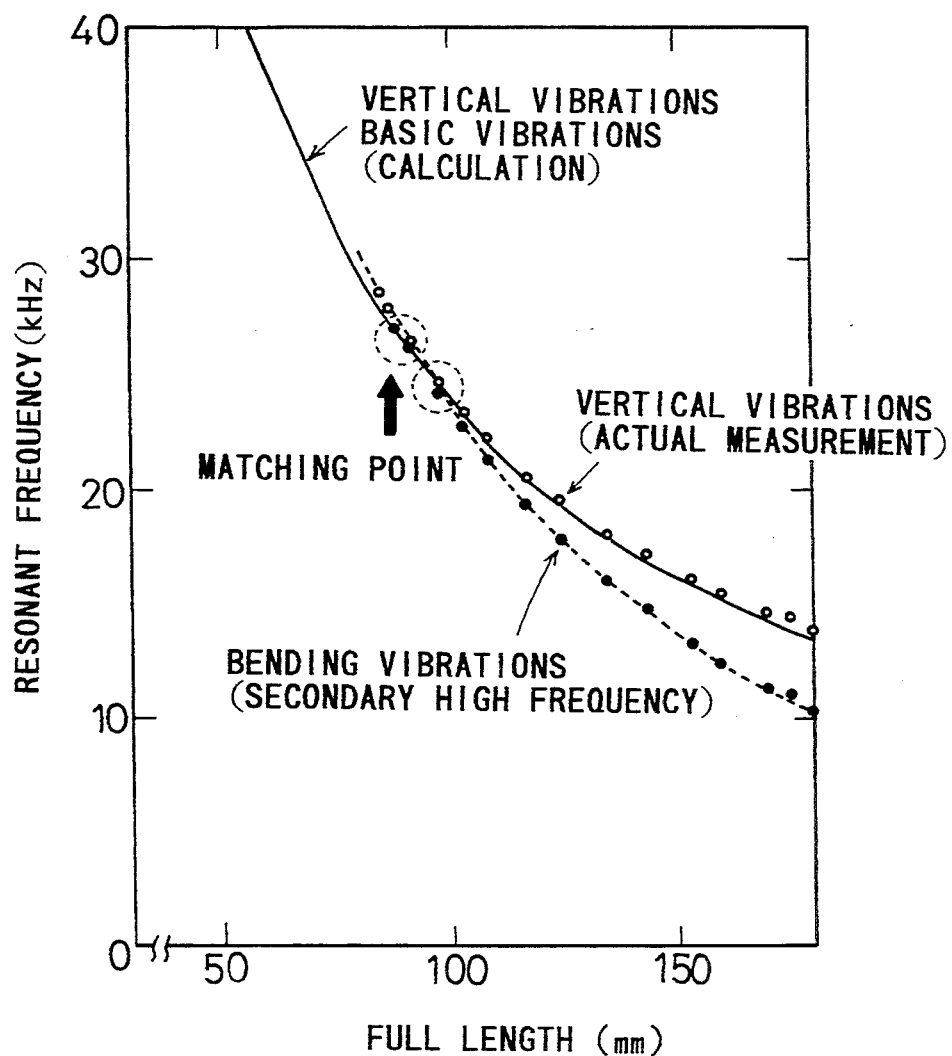
FIG. 18 is a chart showing the full length-resonant frequency characteristics of the first embodiment.

FIGS. 17 and 18 show phenomena used in the course of adjustment to cause the vertical vibrations and the bending vibrations to resonate with each other. In FIG. 18, a white dot shows a basic resonant frequency of the vertical vibrations relative to the full length of the device, while a black dot shows a secondary resonant frequency of the bending vibrations relative to the full length of the device. If, in advance, the full length of the device is set to be slightly longer, and then is gradually shaved, both the basic frequency of the vertical vibrations and the secondary resonant frequency of the bending vibrations are increased. At this time, the secondary resonant frequency is increased more rapidly, producing a full length in which the basic resonant frequency of the vertical vibrations becomes equal to the secondary resonant frequency of the bending vibrations. Accordingly, in the first embodiment of the present invention, the full length of the device is so adjusted that the basic resonant frequency of the vertical vibrations may be equal to the secondary resonant frequency of the bending vibrations.

FIG. 17 shows frequency-impedance characteristics, in which a dot line and a solid line show respective characteristics before and after the adjustment of the full length of the device. At a pocket P, the secondary resonance of the bending vibrations occurs at the same time when the basic resonance of the vertical vibrations occurs.

(Second Embodiment)

Figure 2A:
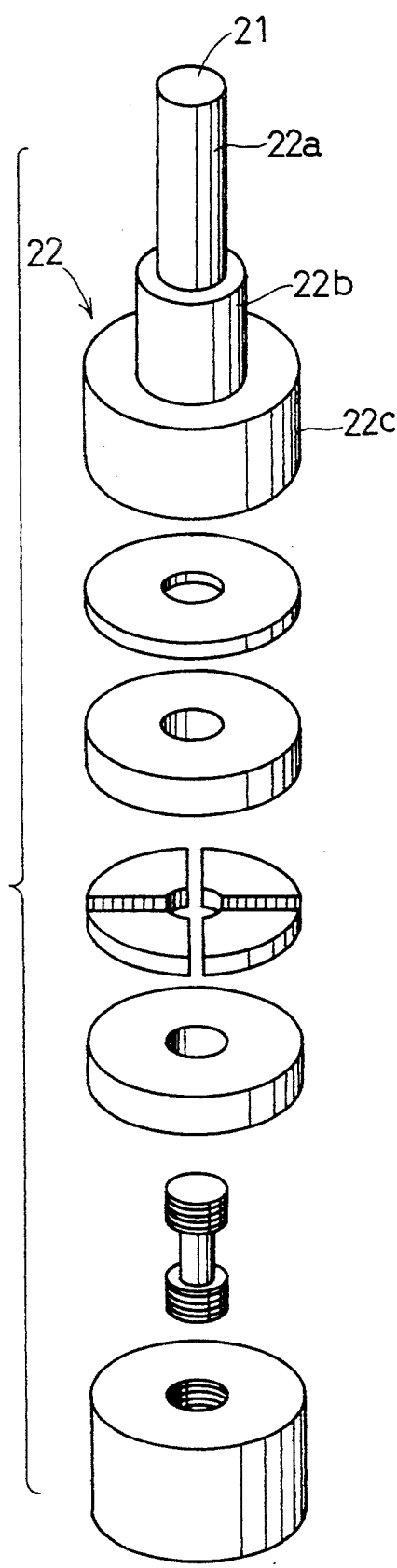
FIGS. 2(a) to 2(c) show a second embodiment of the present invention.
Figure 2C:
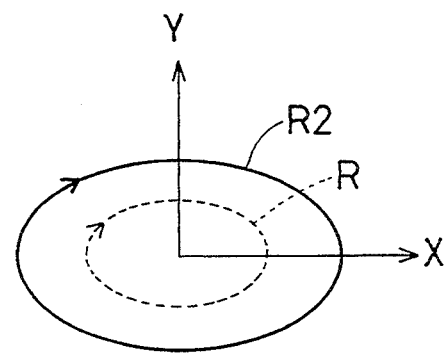
Figure 2B:
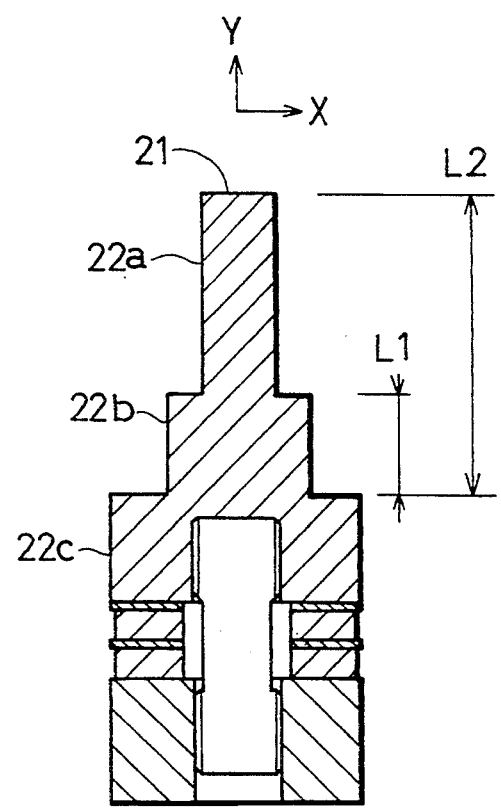

FIGS. 2(a) to 2(c) show a second embodiment in which upper and lower reduced-diameter portions 22a, 22b are used to form a horn for vertical vibrations and the lower reduced-diameter portion 22b is used to form a horn for bending vibrations. This arrangement also permits amplification of vibrations generated in the driving surface 21 both in vertical and transverse directions, so that the driving speed and the driving force are increased.

(Third Embodiment)

Figure 3A:
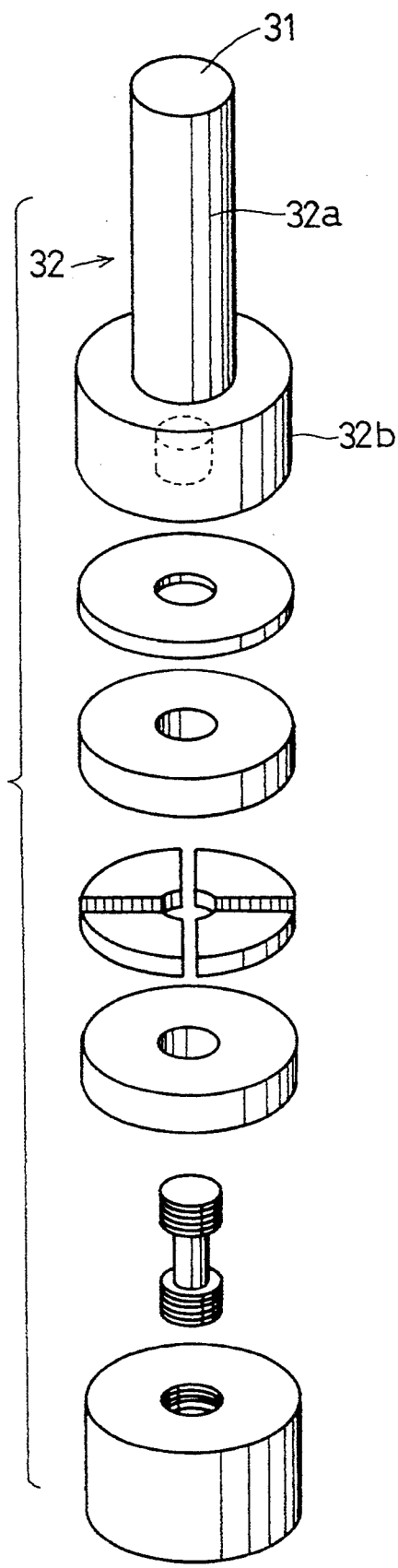
FIGS. 3(a) to 3(c) show a third embodiment of the present invention.
Figure 3B:
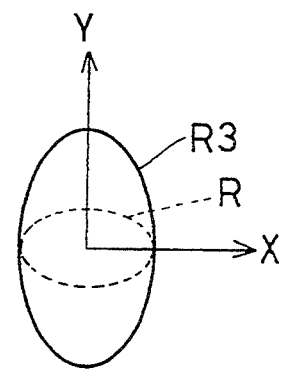
Figure 3C:
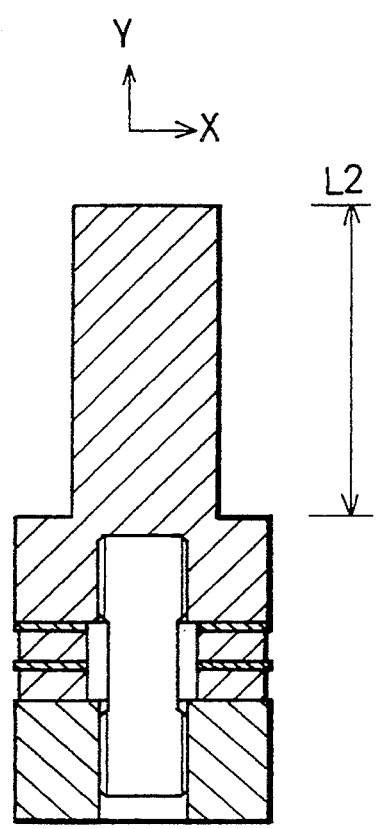

FIGS. 3(a) to 3(c) show a third embodiment in which only a horn for vertical vibrations is formed by a reduced-diameter portion 32a, with no horn being formed for bending vibrations. Formation of only the horn for vertical vibrations permits amplification of vertical vibrations only, as shown by R3 in FIG. 3(c). With this construction, the contact pressure acting between the driving surface and the article to be driven when the article is to be moved to the right is considerably different from that acting between when the article is to be moved to the left, resulting in increased speed obtainable for driving the article.

(Fourth Embodiment)

Figure 4A:
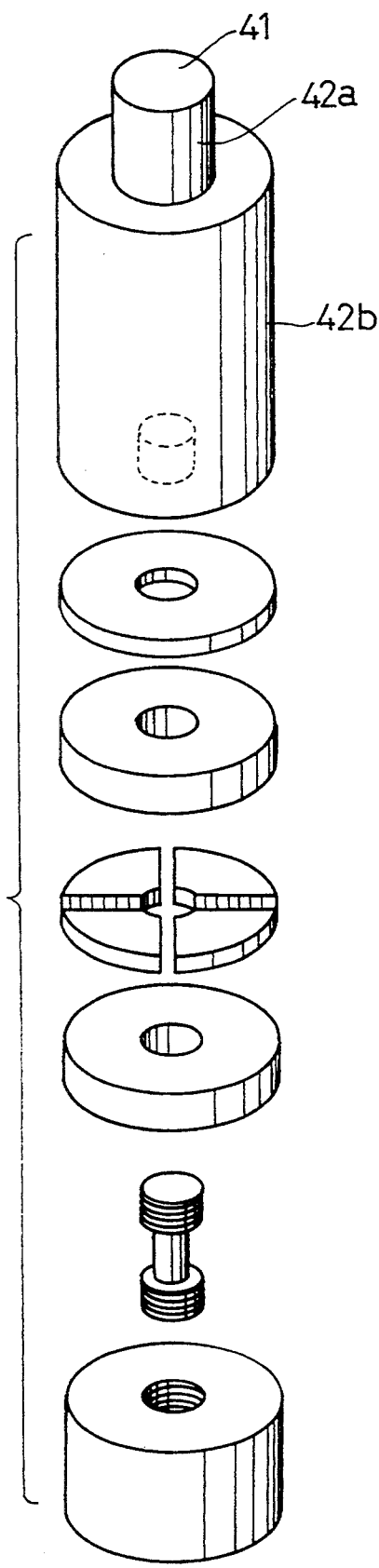
FIGS. 4(a) to 4(c) show a fourth embodiment of the present invention.
Figure 4C:
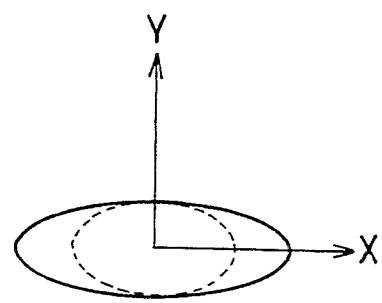
Figure 4B:
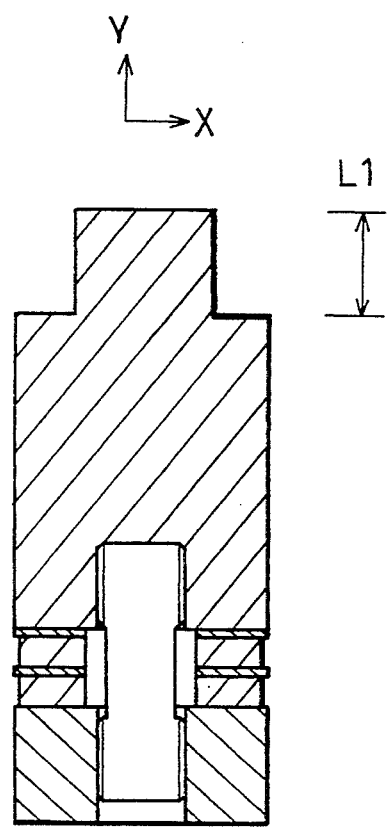
Figure 5:
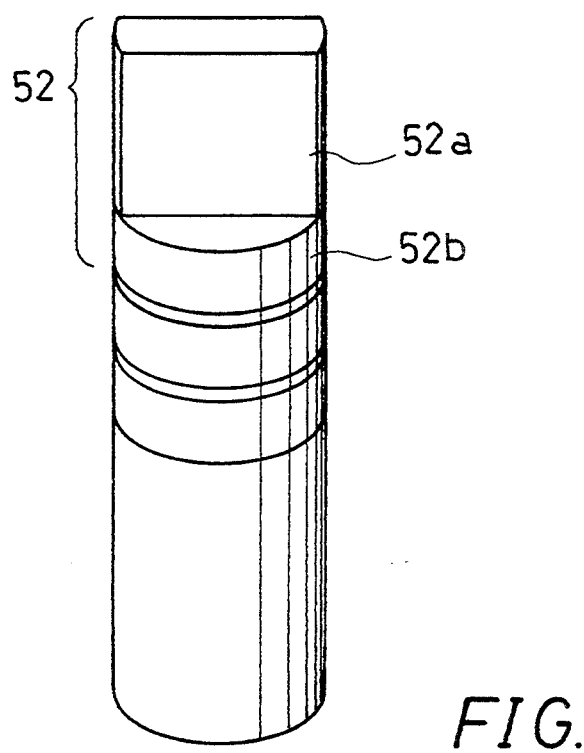
FIG. 5 shows a fifth embodiment of the present invention.
Figure 6:
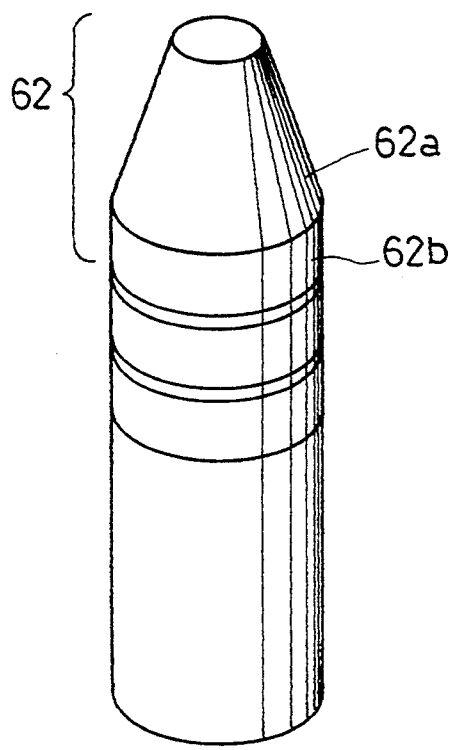
FIG. 6 shows a sixth embodiment of the present invention.
Figure 7:
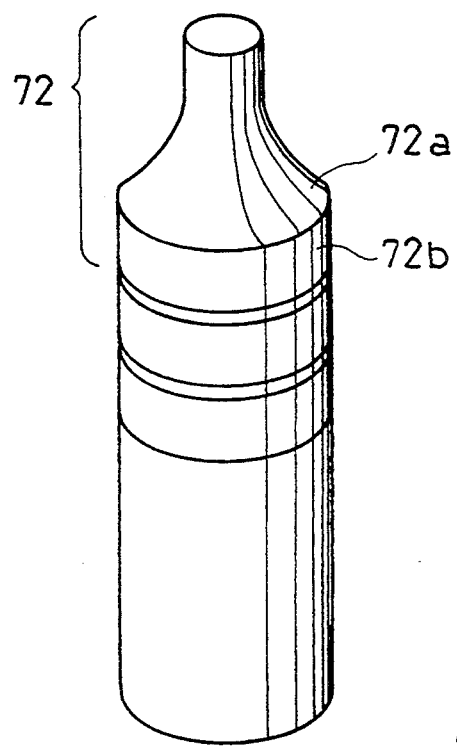
FIG. 7 shows a seventh embodiment of the present invention.
Figure 8:
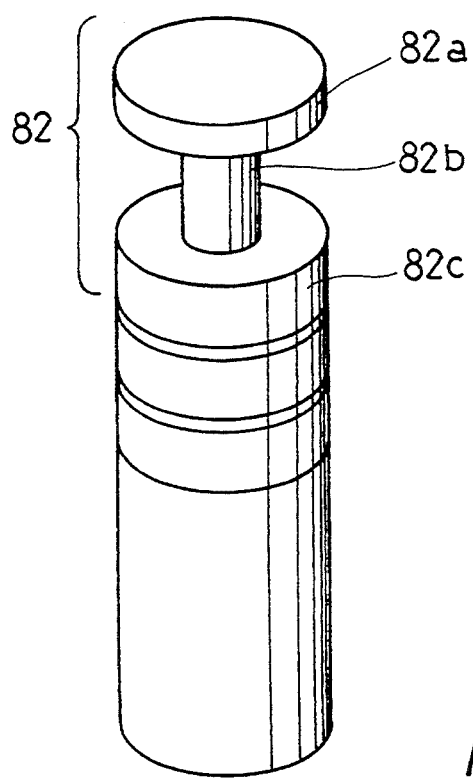
FIG. 8 shows an eighth embodiment of the present invention.

FIGS. 4(a) to 4(c) show a fourth embodiment in which only a horn for bending vibrations is formed by a reduced-diameter portion 42a. This is effective to amplify bending vibrations only, as shown in FIG. 4(c), resulting in improved driving force.

(Other Embodiments)

FIGS. 5, 6, 7, 8 and 12 show other horn configurations which can provide various properties of amplification.

Though a horn or horns are formed in one of the blocks in the above embodiments, such a horn or horns may be formed in either blocks. Furthermore, though two piezoelectric elements are provided between the two blocks in the above embodiments, the number of the piezoelectric elements may be one or more.

Furthermore, in the above embodiments, a primary resonance is used for vertical vibrations and a secondary resonance for bending vibrations, but the order of resonance is not specifically restricted.

What is claimed is:

1. A vibration type driving device, comprising:
   a rod;
   a pair of blocks, each of said blocks being secured to a respective end of the rod;
   an annular piezoelectric element having a central opening, said rod extending through the central opening of said annular piezoelectric element, said annular piezoelectric element being interposed between said pair of blocks;
   a pair of electrodes, each of said electrodes being disposed on a respective surface of said annular piezoelectric element, at least one of said electrodes being divided into at least three electrode sections;
   a high frequency power source having a frequency which is a resonant frequency of vertical vibrations and bending vibrations; and
   switch means connected between said high frequency power source and said at least three electrode sections and responsive to driving directions for connecting a selected part of said at least three electrode sections to said high frequency power source in accordance with the driving directions;
   wherein the full length of said blocks from one end to the other end is set to be equal to half the wave length of the vertical vibrations and also to three halves the wave length of the bending vibrations.

2. The vibration type driving device as defined in claim 1, wherein said at least one of said electrodes is divided into four electrode sections.

3. The vibration type driving device as defined in claim 2, wherein one of said blocks has a driving surface which is movable in a driving direction, and wherein said switch means connects two electrode sections disposed on a side of said at least one of said electrodes opposite to the driving direction to said high frequency power source.

4. The vibration type driving device as defined in claim 2, wherein said high frequency power source generates two modes of sine wave voltage, one phase of which leads another phase by $\pi/2$, and wherein said switch means is adapted to energize two electrode sections disposed on a side of said at least one of said electrodes opposite to the driving direction with sine wave voltage having said other phase, and to energize two electrode sections disposed on a side of said at least one of said electrodes corresponding to the driving direction with sine wave voltage having said one phase.

5. The vibration type driving device as defined in claim 1, wherein at least one of said pair of blocks is formed as a horn.

6. The vibration type driving device as defined in claim 5, wherein the length of said horn is set to be a quarter of the wave length of vertical vibrations generated in the assembly of said rod and said pair of blocks.

7. The vibration type driving device as defined in claim 5, wherein the length of said horn is set to be a quarter of the wave length of bending vibrations generated in the assembly of said rod and said pair of blocks.

8. The vibration type driving device as defined in claim 1, wherein a plurality of piezoelectric elements are provided in layers between said pair of blocks.

9. A vibration type driving device, comprising:
 a rod;
 a pair of blocks, each of said blocks being secured to a respective end of the rod;
 an annular piezoelectric element having a central opening, said rod extending through the central opening of said annular piezoelectric element, said annular piezoelectric element being interposed between said pair of blocks;
 a pair of electrodes, each of said electrodes being disposed on a respective surface of said annular piezoelectric element, at least one of said electrodes being divided into at least three electrode sections;
 a high frequency power source having a frequency which is a resonant frequency of vertical vibrations and bending vibrations; and
 switch means connected between said high frequency power source and said at least three electrode sections and responsive to driving directions for connecting a selected part of said at least three electrode sections to said high frequency power source in accordance with the driving directions;
 wherein at least one of said pair of blocks is formed as a horn, and wherein the length of said horn is set to be a quarter of the wave length of vertical vibrations generated in the assembly of said rod and said pair of blocks; and
 wherein the horn having the length of a quarter of the wave length of said vertical vibrations is provided with a partial horn having a length of a quarter of the wave length of bending vibrations generated in said device.

10. The vibration type driving device as defined in claim 9, wherein said horn and said partial horn are formed in two steps.

* * * * *